United States Patent [19]

Priefert et al.

[11] Patent Number: 4,858,417
[45] Date of Patent: Aug. 22, 1989

[54] MOWER WITH ADJUSTABLE EXTENSION WINGS

[75] Inventors: Marvin J. Priefert; William D. Prifert, both of Mt. Pleasant, Tex.

[73] Assignee: Priefert Mfg. Co., Inc., Mt. Pleasant, Tex.

[21] Appl. No.: 270,834

[22] Filed: Nov. 14, 1988

[51] Int. Cl.$^4$ .................... A01D 75/30; A01D 34/05
[52] U.S. Cl. .......................................... 56/6; 56/13.6; 56/17.1; 56/218
[58] Field of Search .................. 56/6, 13.6, 14.1, 14.8, 56/14.9, 15.2, 15.6, 17.1, 218, 295, DIG. 4

[56] References Cited

U.S. PATENT DOCUMENTS

| | | | |
|---|---|---|---|
| 3,736,735 | 6/1973 | Kulac et al. | 56/6 X |
| 4,160,356 | 7/1979 | Mathews | 56/13.6 X |
| 4,178,744 | 12/1979 | Allely et al. | 56/6 X |
| 4,497,160 | 2/1985 | Mullet et al. | 56/13.6 X |

Primary Examiner—William P. Neuder
Attorney, Agent, or Firm—Rudloph L. Lowell

[57] ABSTRACT

A rotary mower having a central section and extension wings or end sections relatively pivotably movable upwardly and downwardly with respect to the central section. Each of the sections includes a plurality of cutting units mounted for rotation about vertical axis to provide a horizontal cutting plane across the width of the mower when the extension wings are in a lower or mowing position. Each cutting unit is carried on a horizontally disposed pneumatic tire wheel. An external drive rotates one of the tire wheels. The other tire wheels are mounted in frictional circumferential engagement with each other and the driven tire wheel so that all wheels are driven in the mowing position. When either of the extension wings is pivotally raised to a position greater than approximately 30° relative to the center section, its tire wheels are moved out of frictional engagement with the tire wheels of the center section so that its cutting units are rendered inoperable. The mower has an adjustable cutting height and is capable of being tilted upwardly as a unit to a vertical position so as to expose all cutting units and tire wheels for maintenance purposes.

11 Claims, 6 Drawing Sheets

MOWER WITH ADJUSTABLE EXTENSION WINGS

BACKGROUND OF THE INVENTION

The invention relates generally to rotary mowers for cutting grass, brush, and the like and, more particularly, to a mower having a central section and extension wings or end sections, each of which sections includes a plurality of cutter units wherein the cutter units on the end sections automatically disengage from the cutting units on the main section when the end sections are raised from a mowing to a transport position.

Mowers having a plurality of horizontally rotating wheels or drums on which cutter blades are mounted are well known in the art. For example, U.S. Pat. No. 4,160,356 discloses a drum mower having a plurality of vertically oriented drum units. A pneumatic tire is associated with each drum unit and the tires on adjacent drum units are in frictional engagement with each other. An external drive rotates one of the tires with the result that all of the drum units are driven to provide a horizontal cutting plane across the width of the mower.

A friction drive of the type described in U.S. Pat. No. 4,160,356 has the advantages of providing shock absorption by the individual drum units on contact with a hard or immovable obstruction. Moreover, an overload on any of the drum units will merely result in a slippage in the friction drive rather than damage to any of the drum units. The number of drum units to be joined can be varied to form a mower of selected width.

While drum mowers of substantial width can be built using the teachings of the prior art, their horizontal cutting plane limits the usefulness and serviceability of the mowers on uneven or undulating terrain. If portions of the ground being mowed are below the level of the ground supporting the mower, the grass or brush on such portions will be cut higher than desired. On the other hand, material on the portions of the ground above the level of the ground supporting the mower will either be cut too short or the cutter will be moved into contact with the ground. Additionally, servicing or repair of known drum mowers generally requires raising the mower by a hoist or the like to provide access to the cutting units.

SUMMARY OF THE INVENTION

The mower of the present invention retains the shock absorption and limited slippage advantages of a friction drive drum mower utilizing pneumatic tires. In addition, the invention includes a center section with end sections or wings that are raised to a transport position or lowered to a mowing position. In the lower or mowing position, the pneumatic tires on the end sections or wings are in frictional contact with the pneumatic tires on the main or center section of the mower. When raised to a transport position beyond approximately thirty degrees from the horizontal, the tires of the end sections are disengaged from the tires of the center section so that rotation of the cutter units of the end sections is automatically terminated. The end sections can be raised or lowered to compensate for uneven terrain during mowing and are automatically disengaged when raised to the transport position.

The center section is pivotally supported on a ground wheel carrying frame which includes a wheel carrying vertical portion located rearwardly of the center section and a forwardly extended horizontal portion that overlies and is pivotally attached to the center section. A tongue is pivotally connected to the forward portion of the center section for attachment and support of the mower on a tractor vehicle.

A two position swing arm is pivotally mounted on the center section between the wheel carrying frame and the tongue. The swing arm is movable to a first position locked to the tongue and to a second position locked to the wheel carrying frame. With the swing arm in the first position, the center section is vertically adjustable relative to the ground. In the second position of the swing arm, the center section is tiltable to a vertical position exposing the cutter units for repair and maintenance access.

DETAILED DESCRIPTION OF A PREFERRED EMBODIMENT

Figure 1:
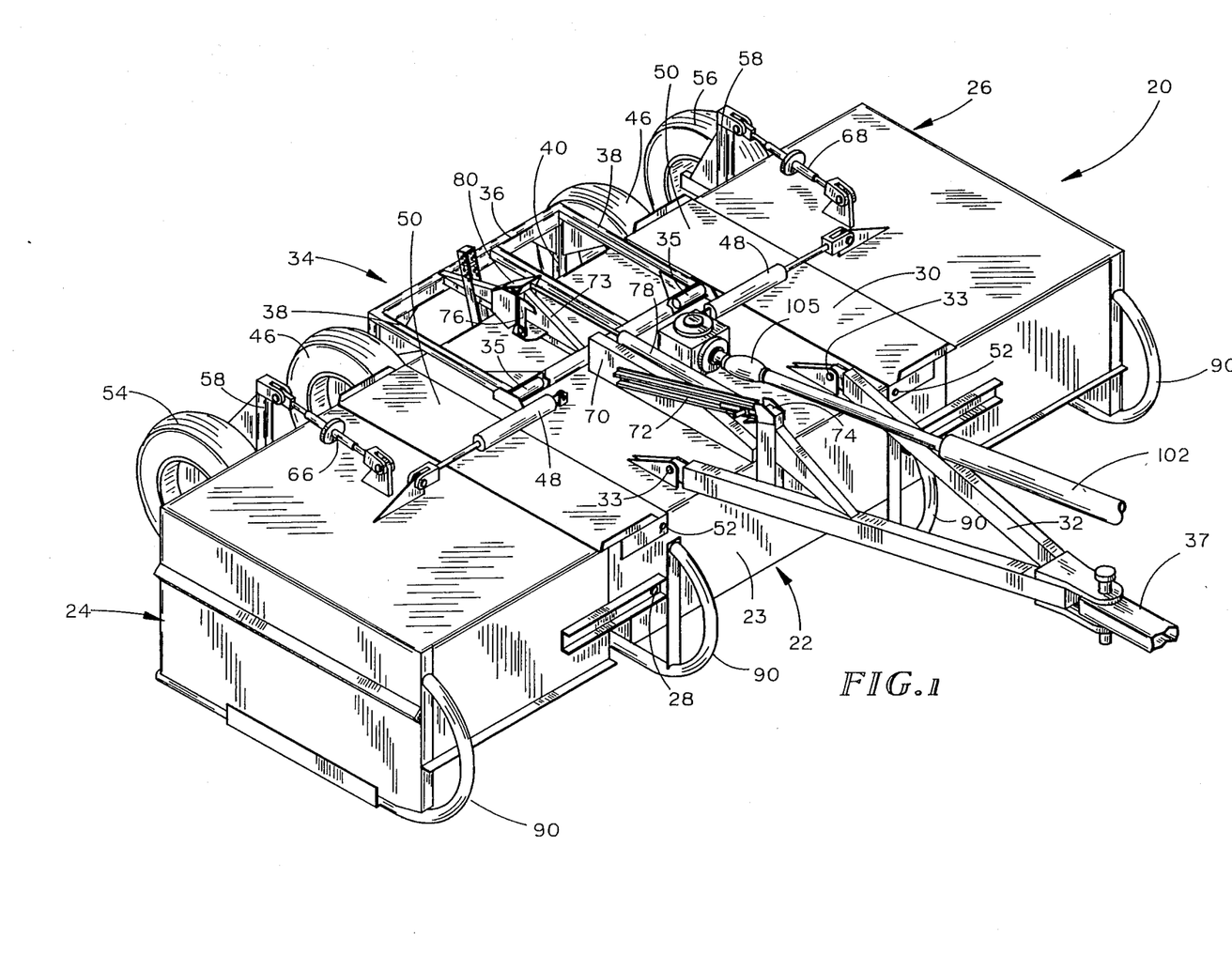
FIG. 1 is a front perspective view of the mower showing the wings or end sections thereof in a lower or mowing position therefor.

A mower, indicated generally at 20 in FIG. 1, includes a center section 22 and a pair of extension wings or end sections 24 and 26 attached to the center section 22 for up and down pivotal movement about an associated horizontal axis 28. The center section 22 includes a housing 23 having an upper deck 30. A tongue 32 is pivotally attached at 33 to a forward portion of the center section for pivotal up and down movement.

Figure 14:
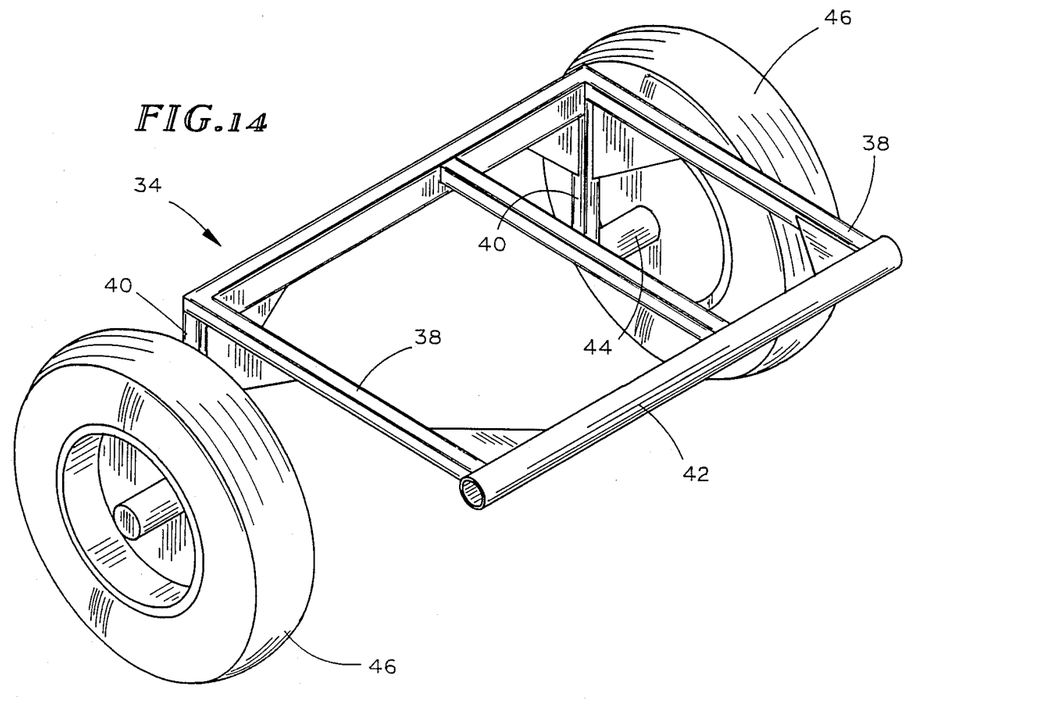
FIG. 14 is a perspective view of the wheel carrying frame.

The mower 20 further includes a ground wheel carrying frame 34 (FIGS. 1 and 14) which includes a downwardly extended wheel support portion 40 located rearwardly of the central section 22 and a forwardly extended horizontal portion 38 that overlies the rear portion of the deck 30. A front tube member 42 on the horizontal portion 38 has the ends thereof rotatably supported on stub shafts 35 mounted on the deck 30. The ground wheel carrying frame 34 is thus pivotally interconnected with the deck 30 and in turn with the center section 22.

Figure 2:
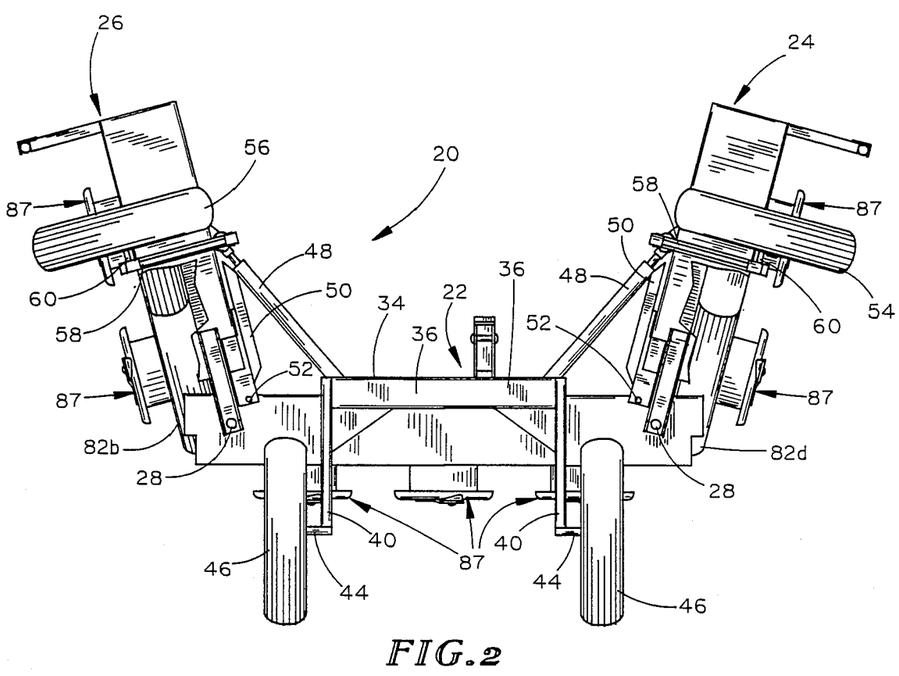
FIG. 2 is a rear elevational view of the mower showing the end sections in an upper or transport position therefor.

As best shown in FIG. 2, the lower end portions of the downwardly extended wheel support portion 40 terminate in stub axles 44 for a pair of ground support wheels 46. The mower 20 is, accordingly, adapted to be pulled along the ground by virtue of its support on the ground support wheels 46 and by attachment to and support of the tongue 43 on a tractor draw bar 37.

The end sections 24 and 26 of the mower 20 are shown in a lower or mowing position in FIG. 1. Pivotally interconnected between the end sections 24 and 26 and the center section 22 are a pair of hydraulic cylinders 48 for lowering and raising the end sections 24 and 26 relative to the center section 22. As illustrated in FIG. 2, retraction of the hydraulic cylinders 48 elevates the end sections 24 and 26 to their upper or transport positions. A pair of shields or plates 50 are pivotally connected to the center section 22 at 52 and overlie the junction of the center section 22 and the end sections 24 and 26 to prevent material, during mower operation, from being forcefully ejected upwardly at such junctions.

An adjustable ground support wheel 54 and 56 is provided for each end section 24 and 26, respectively. A wheel support 58 pivotally attached to each end section 24 and 26 includes a stub axle 60 for rotatably supporting an associated wheel 54 or 56.

Figure 11:
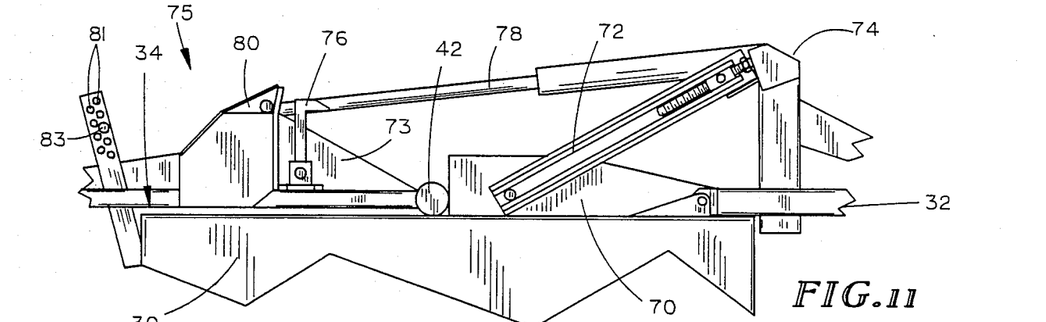
FIG. 11 is an enlarged detail view showing the swing arm locked to the tongue of the mower.
Figure 12:
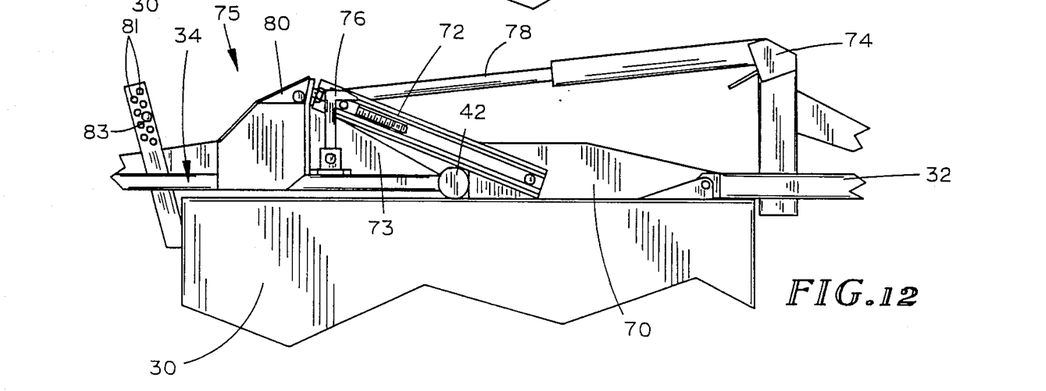
FIG. 12 is illustrated similar to FIG. 11 and shows the swing arm locked to the wheel carrying frame.

The deck 30 of the center section 22 of the mower 20 includes an upright stiffener or rib 70 (FIG. 1) located intermediate the end sections 24 and 26 and forwardly of the front tube 42 of the horizontal portion 38 of the wheel carrying frame 34. A swing arm 72 is pivotally supported on the rib 70 for movement between a forwardly extended position, as illustrated in FIGS. 1 and 11, and a rearwardly extended position, as illustrated in FIG. 12. An upright mounting bracket 74 on the tongue 32 is arranged to releasably capture the free end portion of the swing arm 72 in its forward position. An upright latch or pawl 76 on the forward portion 38 of the carrying frame 34 releasably captures the free end portion of the swing arm 72 when in its rearward position.

A hydraulic cylinder 78 extends between and is pivotally connected to the tongue bracket 74 and an upright support member 80 secured to and extended upwardly from a center brace member 73 on the horizontal portion 38 of the wheel carrying frame 34. The swing arm 72, when locked in its forward or mower operational position, as illustrated in FIG. 11, locks the center section 22 against pivotal movement relative to the tongue 32 by way of the tongue bracket 74. Accordingly, extension and retraction of hydraulic cylinder 78 acts to pivot the ground carrying frame 34 relative to the center section 22 about the stub axles 44 (FIG. 1).

Figure 9:
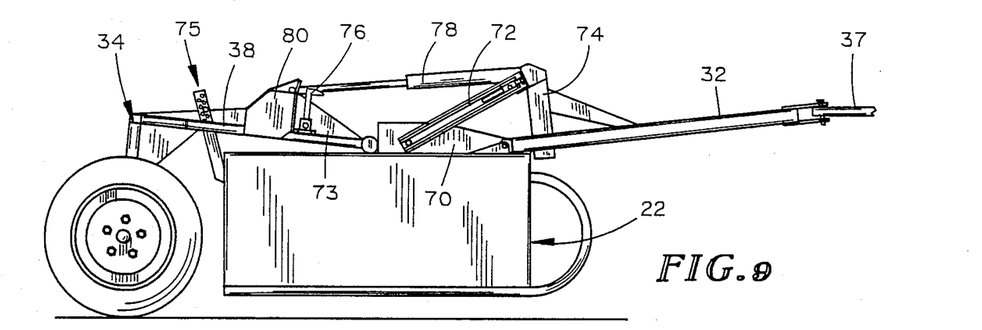
FIG. 9 is an end view of the mower with the swing arm locked to the mower tongue and the mower in a lowered mowing position.
Figure 10:
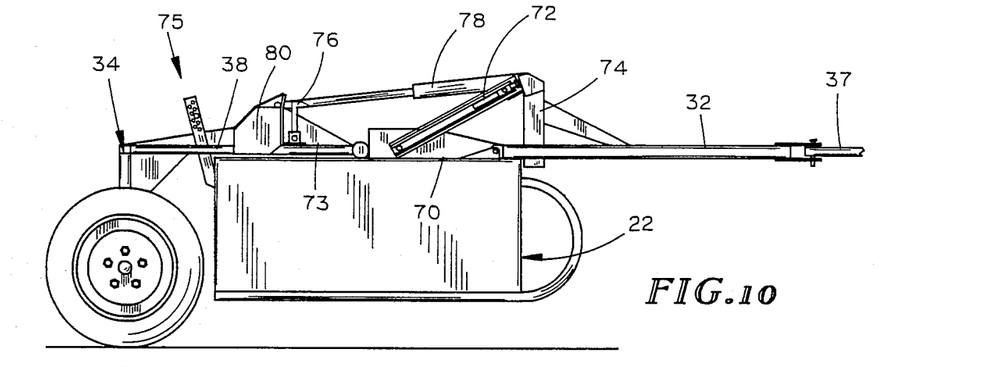
FIG. 10 is illustrated similar to FIG. 9 and shows the mower in a raised mowing position.

Extension of hydraulic cylinder 78 moves the forwardly extended portion 38 of the ground wheel carrying frame 34 toward the deck 30 of the center section 22, as illustrated in FIG. 10. Retraction of the hydraulic cylinder 78 pivots the ground wheel carrying frame 34 upwardly with respect to the center section 22, thereby lowering the center section 22 with respect to the ground, as illustrated in FIG. 9. Hydraulic cylinder 78, therefore, adjusts the height of the center section 22 with respect to the ground when the swing arm 72 is locked in its forward or mower operational position.

Figure 13:
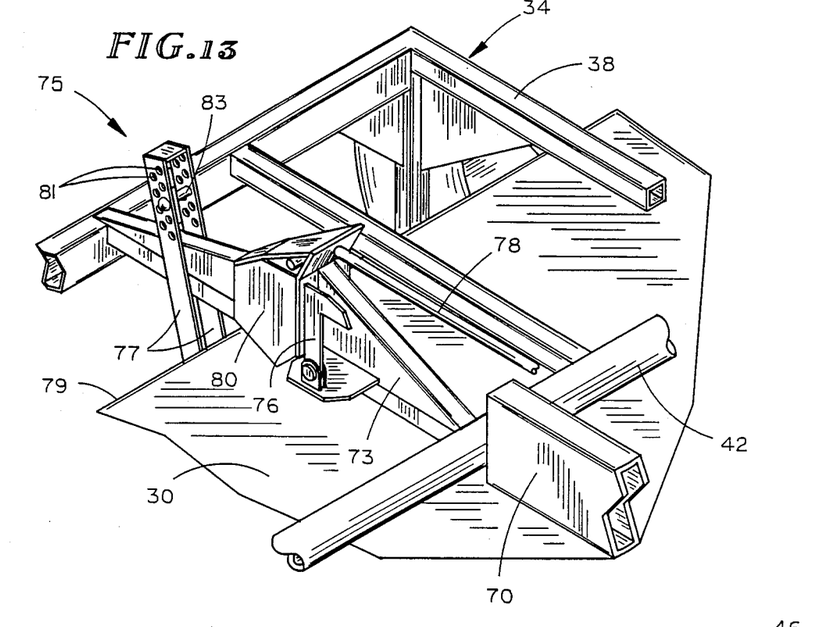
FIG. 13 is an enlarged detail perspective view of the mechanism for locking the mower center section in an adjusted cutting position relative to the mower wheel carrying frame.

The adjusted cutting position of the center section 22 of the mower is maintained by a locking mechanism 75 (FIGS. 7 and 13) that includes a pair of upright members 77 projected upwardly from and secured to a rear wall 79 of the center section housing 23 in a straddling relation with a brace member 73 on the horizontal portion 38 of the wheel carrying frame 34 (FIG. 13). The upper end of each upright member 77 is formed with a series of vertically spaced holes 81 for receiving a locking pin 83 at a position above the brace member 73.

In adjusting the cutting position of the center section 22, the hydraulic cylinder 78 is initially operated to permit removal of the locking pin 83 (FIG. 11) from the upright members 77. With the swing arm 72 connected to the mounting bracket 74 and the hydraulic cylinder 78 extended between and connected to the support member 80 on the brace member 73, the wheel carrying frame 34, on retraction of the hydraulic cylinder 78 (FIG. 9), is pivotally moved upwardly about the stub axles 44 to lower the center mower section 22. When the hydraulic cylinder 78 is extended (FIG. 10), the wheel carrying frame 34 is pivotally moved downwardly to elevate the center section 22. The adjusted position of the center section 22 is maintained by inserting the locking pin 83 within that pair of oppositely aligned holes 81 located nearest the upper surface of the brace member 73 for abutting engagement therewith whereby to lock the center section 22 against downward pivotal movement relative to the wheel carrying frame 34.

The end sections 24 and 26 are separately adjusted to the cutting position of the center section 22 by means including a pair of jack screws 66 and 68 which are pivotally interconnected between the upper end portions of wheel supports 58 and associated end sections 24 an 26 (FIG. 1). The jack screws 66 and 68 are extended and retracted to raise and lower a corresponding wheel support 58. In this manner, the ground wheel supports are adjusted to support the corresponding end sections 24 and 26 at the cutting height of the center section 22 over a level terrain. Since the cylinder assemblies 48 are without pressure during a cutting operation, the end sections 24 and 26 are permitted up and down pivotol movement relative to the center section 22 to accomodate variations in terrain.

Figure 4:
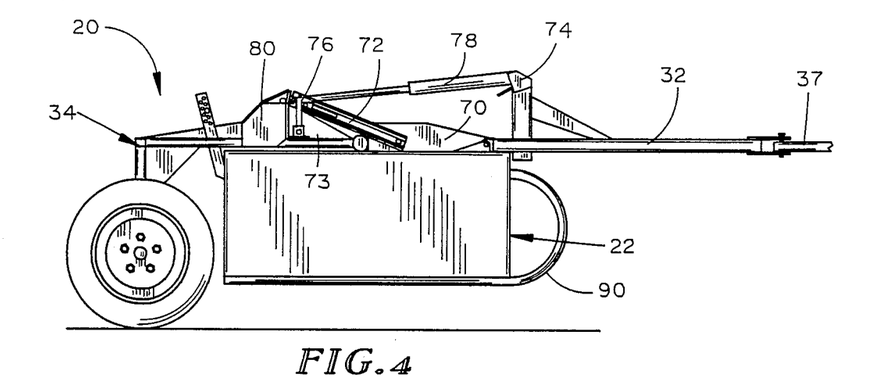
FIG. 4 is an end view of the mower in a mowing position therefor.
Figures 5, 6, 15:
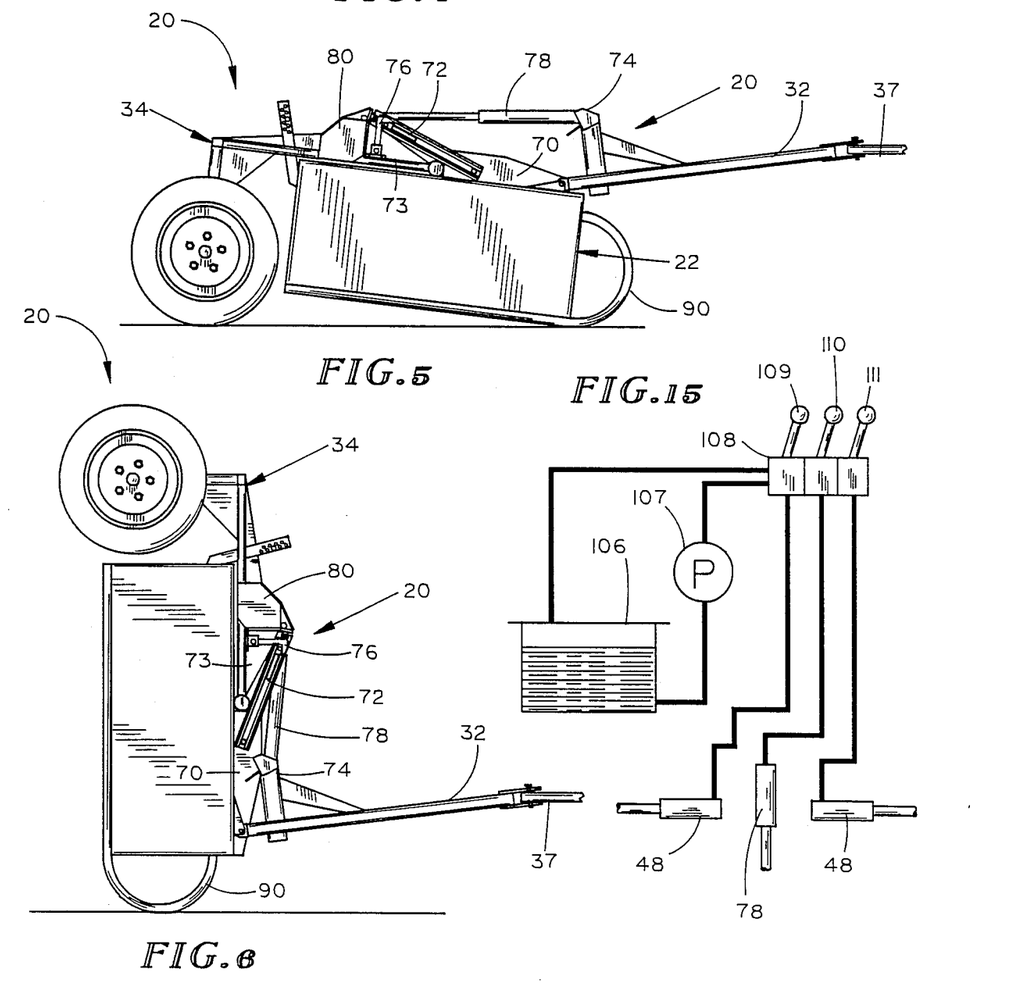
FIG. 5 is an end view of the mower shown in position to be tilted vertically on the front end thereof.
FIG. 6 is an end view of the mower tilted to a substantially vertical position to expose the cutter units for service and maintenance.
FIG. 15 is a diagrammatic illustration of the hydraulic control system for the mower.

When the swing arm 72 is locked in its rearward or maintenance position (FIGS. 4–6 and 12) the ground wheel carrying frame 34 is locked against pivotal movement with respect to the center section 22 whereby, on operation of the hydraulic cylinder 78, the center section 22 and the wheel carrying frame 34 are pivotally moveable as a unit with respect to the tongue pivot 33. From a cutting position of the mower, as illustrated in FIG. 4, retraction of the hydraulic cylinder 78 initially lowers the forward portion of the mower 20 to a ground contact position as illustrated in FIG. 5. In this position, the weight of the mower 20 will be supported on a number of rocker members or arcuate runners 90 spaced along and secured to the front sides of the mower sections 22, 24 and 26. As retraction of the hydraulic cylinder 78 is continued, the mower 20 will be tilted on the runners 90 to a vertical or maintenance position, illustrated in FIG. 6, to provide free access to the mower cutter units 87 as best shown in FIGS. 7 and 8.

Figure 3:
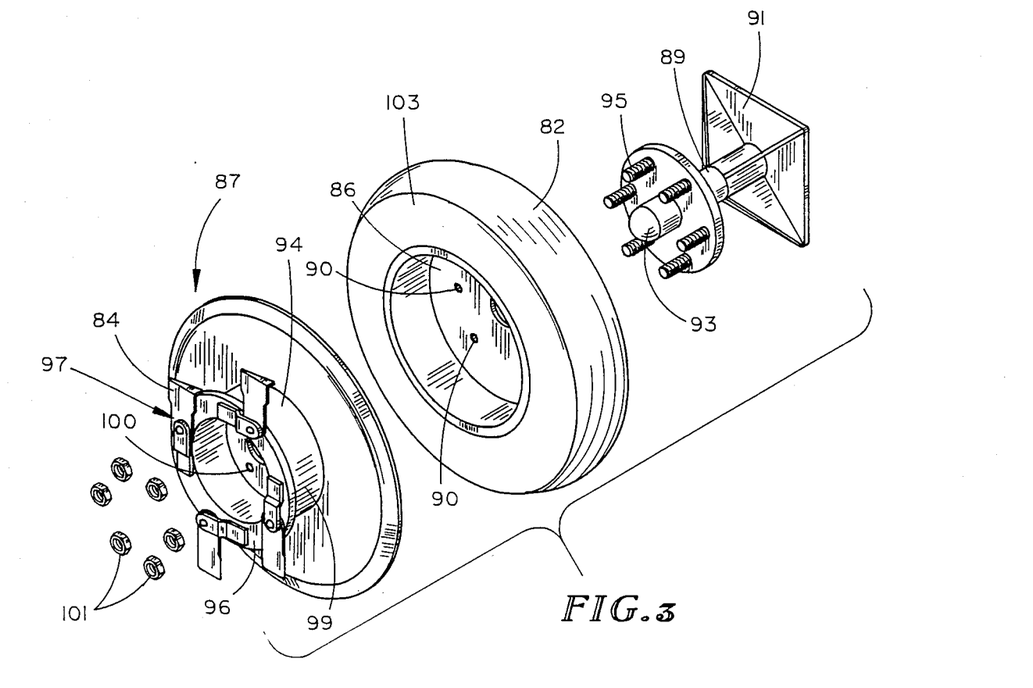
FIG. 3 is an exploded perspective view of a cutter unit of the mower.
Figure 7:
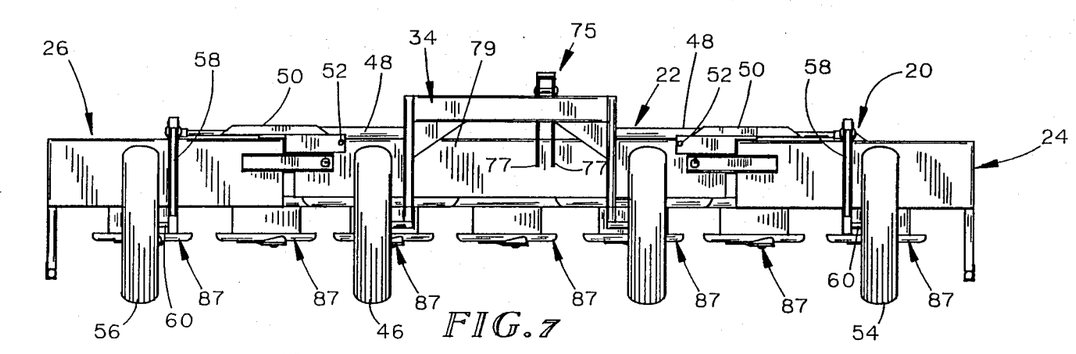
FIG. 7 is a rear elevational view of the mower in a mowing position.

The center section 22 and the end sections 24 and 26 each carries a plurality of cutter units 87 on the undersides thereof (FIG. 7). Each cutter unit 87 (FIG. 3) is supported for rotation on a vertical shaft 89 secured to a base plate 91 that is carried on the underside of the frame structures of the center section 22 and end sections 24 and 26. Rotatably mounted on the shaft 89 is a hub member 93 provided with wheel lugs 95 for coacting association, in a usual manner, with the hub 88 of a pneumatic tired wheel 86 equipped with a tire 82.

A cutter mechanism 97 (FIG. 3) includes a tubular body member or drum 99 having a laterally extended annular flange or rim 96 at one end thereof that carries a plurality of pivotal cutter blades 84. The opposite end of the drum 99 has a hub 98 therein of a size and shape corresponding to the wheel hub 88. In the assembly of a cutter unit 87, a tire guard 92 of a disc shape is placed about the drum and against the flange 96, after which the hubs 98 and 88 are positioned in mating engagement with the holes therein in axial alignment for receiving the wheel lugs 95. On tightening of the lug nuts 101, the cutter mechanism 97, pneumatic tired wheel 86 and hub members 93 and 98 are connected together for rotation as a unit on the shaft 89. In this respect, it is to be noted that the tire guard 92 is of a diameter to overlie the bottom side wall 103 of the tire 82 for protection against upstanding objects encountered by the mower during a cutting operation.

Figure 8:
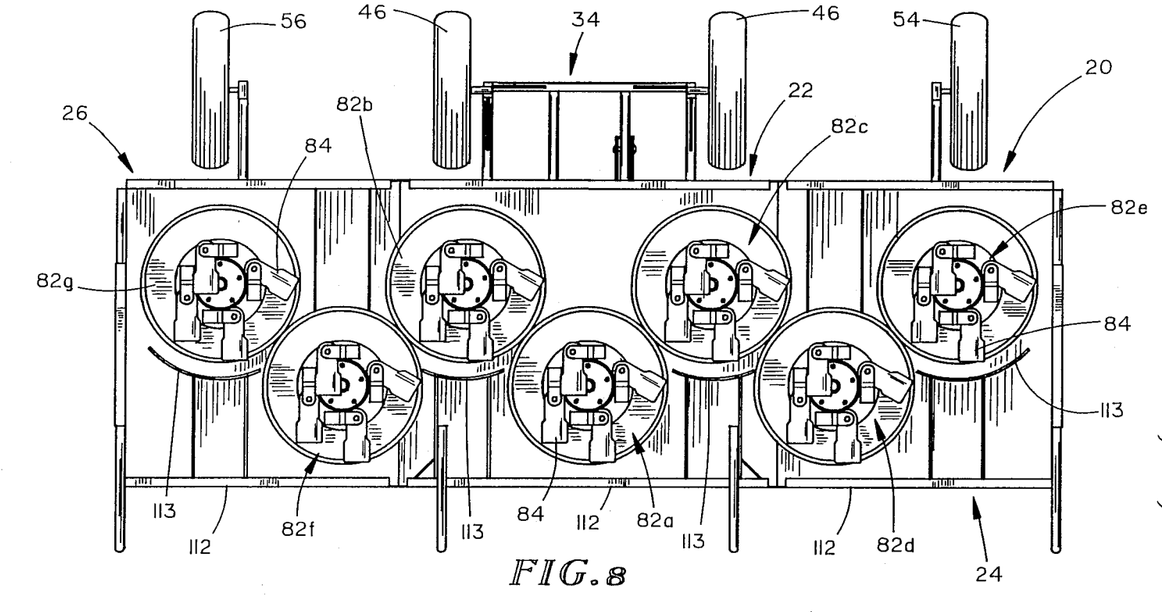
FIG. 8 is a bottom elevational view of the mower in the vertical position therefor shown in FIG. 6.

The peripheral surface of each pneumatic tire 82 is in frictional engagement with each adjacent pneumatic tire 82 (FIG. 8). The center tire 82a on the center section 22 is driven from the tractor power take off through a drive shaft 102 (FIG. 1) and gear unit 104 connected together at 105 by a releasable coupling unit. Each tire 82 frictionally engages an adjacent tire so that rotation of the center tire indicated at 82a will effect rotation of the other pneumatic tires 82. The three tires, 82a, 82b, and 82c, are mounted on the center section 22 of the mower 20, with a pair of the pneumatic tires 82d and 82e mounted on the end section 24 and a pair of tires 82f and 82g on the end section 26. When the end sections 24 and 26 are in their lower or operational positions (FIGS. 7 and 8) tire 82d is in frictional engagement with tire 82c and tire 82f is in frictional engagement with tire 82b so that all of the pneumatic tires 82 are rotated simultaneously with rotation of the driven center tire 82a.

On pivotal movement of the end sections 24 and 26 to their upper or transport positions, as illustrated in FIG. 2, the tires 82d and 82f will be automatically moved out of frictional engagement with the tires 82c and 82b, respectively. In this event, rotation of the driven center tire 82a will be transmitted only to the tires 82b and 82c so that the exposed cutting units 87 of the end sections 24 and 26 will no longer be rotated, thereby decreasing the risk of injury from contact with the exposed cutting units.

In operation, one or both of the end sections 24 and 26 are lowered to the horizontal or operating position therefor which may be defined by the engagement of coacting stop members (not shown) suitably positioned on the center section 22 and end sections 24 and 26. Lowering of the end sections to operating positions therefor automatically moves the tires 82d and 82f into frictional engagement with the tires 82c and 82b, respectively, of the center section 22. As a result, the operative mowing width of the mower 20 may be adjusted to include either the center section 22 only or the center section 22 in combination with either or both of the end sections 24 and 26. For this purpose, the towing tractor is provided in a usual manner with a hydraulic power system (FIG. 15) that includes a fluid reservoir 106 and a pump 107 having an outlet connected to a valve unit 108 equipped with three valve control handles 109, 110, and 111, with the controls 109 and 111 corresponding to hydraulic cylinders 48 for pivotally actuating the end sections 24 and 26, and the control 110 corresponding to the hydraulic cylinder 78 for adjustably actuating the mower 20. As is well known, each handle may have a neutral position from which it is moveable to an operating position to each side thereof.

The tires 82 provide a drive system for the cutting units 87 capable of absorbing operating shocks resulting from mowing over uneven ground or the cutters contacting hard or immovable objects. Where such contact occurs, the tire on the involved cutter unit 87 will slip relative to adjacent tires so that the shock of the contact is not transmitted to the drive system or to other mower components.

To minimize any damage to the tires 82 during mower operation, the front side walls 112 of the housings for the center section 22 and end sections 24 and 26 extend downwardly to positions at least level with the undersides of the tires 82. In addition, and as shown in FIG. 8, each mower section 22, 24 and 26 has an upright arcuate tire guard 113 positioned in a concentrically spaced relation forwardly of each of rear cutter units 87 thereon.

As mentioned above, the mower 20 can be tilted to a vertical or maintenance position as illustrated in FIGS. 6 and 8. In this position easy and convenient access is had to the cutter units 87 for repair and maintenance. Importantly, this maintenance position cannot be attained until the drive shaft 102 is disconnected from the tractor power take off at the coupling 105 to render the cutting units 87 inoperative.

The invention has been described with reference to the preferred embodiment. Modifications and alterations will occur to others upon reading and understanding the detailed description of the preferred embodiment. It is intended that the invention be construed as including all such alterations and modifications insofar as they come within the scope of the following claims.

I claim:

1. In a tractor drawn mower having a horizontal main frame with generally transversely disposed horizontally rotatable cutting units, a system for vertically adjusting said cutting units to a mowing position and for exposing said cutting units for maintenance accessibility, comprising:
   (a) a ground wheel carrying frame for said main frame having a generally horizontal section with a front portion overlying a rear portion of the main frame and a downwardly extended upright section arranged rearwardly of said rear portion;
   (b) a pair of ground wheels supported on said rear section;
   (c) means pivotally supporting said wheel carrying frame on said main frame for up and down movement of said main frame relative to said rear section;
   (d) a tongue structure having a front end attachable to a tractor and a rear end pivotally supported on said main frame;

(e) means on said main frame movable to a first position to releasably lock said main frame and tongue structure against relative pivotal movement, and to a second position to releasably lock said wheel carrying frame and main frame against relative pivotal movement; and (f) power means for pivotally moving said main frame relative to said wheel carrying frame when the releasable locking means is in said first position therefor to vertically adjust said cutting units relative to the ground surface, and for pivotally moving said main frame and wheel carrying frame as a unit relative to said tongue structure, when the releasable locking means is in the second position therefor, to an upright position to expose said cutting units.

2. A tractor drawn mower according to claim 1, wherein said releasable locking means includes:

(a) a swing arm, pivotally mounted on said main frame for pivotal movement to a rearwardly extended first position corresponding to the first position of said releasable locking means, and to a forwardly extended second position corresponding to the second position of said releasable locking means; and (b) means on said wheel carrying frame and tongue structure for respectively releasably engaging the free end of said swing arm in the first and second positions therefor.

3. A tractor drawn mower according to claim 1, wherein said power means includes:

(a) a linearly extendable and retractable power unit extended between and pivotally connected to said tongue structure and wheel carrying frame.

4. The tractor drawn mower according to claim 1, further comprising:

(a) coacting means on said main frame and wheel carrying frame for retaining said cutting units in a vertically adjusted position therefor, and said main frame and wheel carrying frame for movement as a unit to the upright position of said main frame.

5. A tractor drawn mower according to claim 1, further comprising:

(a) an upright rocker member mounted at each end of the main frame and projected forwardly from the front side thereof;

(b) said rocker members, on pivotal movement of the main frame to the upright position therefor, being moved into ground engagement to support the main frame for tilting movement to the upright position therefor.

6. A tractor drawn mower according to claim 5, wherein:

(a) each of said rocker members is of an arcuate shape in side elevation having a forward convex section for ground engagement.

7. In a tractor drawn mower having a wheel supported main frame with horizontally rotatable cutting units, a drive system for said cutting units comprising:

(a) a horizontally rotatable pneumatic tired wheel for each of said cutting units, including a tire having a tread portion, and a lower sidewall;

(b) a rotatable cutter assembly for each cutter unit positioned below each tire;

(c) means rotatably supporting said cutter units on said main frame with adjacent tires having the tread portion thereof in frictional engagement;

(d) means for supplying power to one of said pneumatic tired wheels to impart rotation to all of said cutter units, and (e) a guard member for each of said lower sidewalls comprising a disc member arranged to the underside of an associated tire having a central opening coaxial with the rotational axis of a cutter unit and a peripheral section in abutting engagement with said tire lower sidewall to provide a coverplate therefor.

8. A mower according to claim 7, wherein:

(a) said guard member is of a general dish-shape with the convex side thereof faced downwardly.

9. In a mower having a wheel supported central frame and end frames pivotally connected to said central frame for movement to a first operating position extended horizontally from said central frame and to a second transport position inclined upwardly and outwardly relative to said central frame and horizontally rotatable cutting units on said central frame and on each end frame, a drive system for said cutting units comprising:

(a) a plurality of generally transversely disposed horizontally rotatable pneumatic tire wheels corresponding in number to said cuttings units;

(b) said pneumatic tire wheels having the adjoining peripheral surfaces thereof in frictional engagement when said end frames are in horizontally extended first positions therefor;

(c) means for supplying power to one of the pneumatic tire wheels on said central frame to impart rotation to all of said pneumatic tire wheels when the end frames are in the horizontally extended first positions therefor; and (d) means providing for the innermost pneumatic tire wheel on an end frame being out of frictional engagement with the adjacent pneumatic tire wheel on said central frame when an end frame is in the upwardly and outwardly inclined second position therefor.

10. A mower according to claim 9, further comprising:

(a) linearly extendable and retractable power means extended between and interconnected to each end frame and central frame; and (b) means pivotally connecting each end frame to said central frame for pivotal movement to said first and second positions therefor;

(c) said end frames being independently or concurrently operated to the first and second positions therefor to vary the width of the cutting path of said cutting units.

11. A mower according to claim 9, further comprising:

(a) a ground wheel rotatably mounted on each end frame to support each end frame in said first position therefor.

* * * * *